United States Patent
Yildirim et al.

(10) Patent No.: US 11,465,278 B2
(45) Date of Patent: Oct. 11, 2022

(54) ROBOTIC MANIPULATOR INCLUDING PNEUMATIC ARTIFICIAL MUSCLE

(71) Applicant: OZYEGIN UNIVERSITESI, Istanbul (TR)

(72) Inventors: Mehmet Can Yildirim, Cekmekoy/lstanbul (TR); Ozkan Bebek, Cekmekoy/lstanbul (TR); Regaip Barkan Ugurlu, Cekmekoy/lstanbul (TR)

(73) Assignee: OZYEGIN UNIVERSITESI, Istanbul (TR)

( * ) Notice: Subject to any disclaimer, the term of this patent is extended or adjusted under 35 U.S.C. 154(b) by 45 days.

(21) Appl. No.: 17/274,549

(22) PCT Filed: Sep. 10, 2018

(86) PCT No.: PCT/TR2018/050474
§ 371 (c)(1),
(2) Date: Mar. 9, 2021

(87) PCT Pub. No.: WO2020/055342
PCT Pub. Date: Mar. 19, 2020

(65) Prior Publication Data
US 2022/0048184 A1    Feb. 17, 2022

(51) Int. Cl.
*B25J 9/14* (2006.01)
*B25J 9/10* (2006.01)

(52) U.S. Cl.
CPC ............. *B25J 9/1075* (2013.01); *B25J 9/104* (2013.01); *B25J 9/142* (2013.01)

(58) Field of Classification Search
CPC . B25J 9/104; B25J 9/1075; B25J 9/142; B25J 9/144
See application file for complete search history.

(56) References Cited

U.S. PATENT DOCUMENTS

| 7,367,245 B2 * | 5/2008 | Okazaki | B25J 9/104 74/490.06 |
| 10,632,626 B2 * | 4/2020 | Popovic | B25J 17/00 |

(Continued)

FOREIGN PATENT DOCUMENTS

| CN | 201493846 | 6/2010 |
| CN | 206066458 | 4/2017 |

(Continued)

OTHER PUBLICATIONS

International Search Report and Written Opinion for PCT/TR2018/050474. dated Sep. 7, 2019. 9 pages.

(Continued)

*Primary Examiner* — William C Joyce
(74) *Attorney, Agent, or Firm* — Casimir Jones SC; Lisa Mueller (57) ABSTRACT

A robotic manipulator, comprising: a platform (302); a first pair of pneumatic artificial muscle (PAM) devices (112,114) coupled to the platform (302) at a first end of the first pair of PAM devices; a second pair of PAM devices (116, 118) coupled to the platform (302) at a first end of the second pair of PAM devices; a first pulley (342) coupling the first pair of PAM devices via a first belt (132) at a second end of the first pair of PAM devices; a second pulley (344) coupling the second pair of PAM devices via a second belt (134) at a second end of the second pair of PAM devices; a U-joint (160) positioned between the first and second pulleys, wherein the first pulley (342), the second pulley (344), and the U-joint (160) are rotatable along a pitch axis (P1), a yaw axis (Y1), and a roll axis (R1); and an actuated object (170) coupled to the U-joint (160), wherein motion of one of the first belt (132) of the first pair of PAM devices, the second belt (134) of the second pair of PAM devices, and both the first belt (132) and the second belt (134), cause motion of the (Continued)

actuated object (170) along one of the pitch axis (P1), the yaw axis (Y1), and the roll axis (R1).

19 Claims, 10 Drawing Sheets

(56) References Cited

U.S. PATENT DOCUMENTS

| 2012/0017718 A1* | 1/2012 | Greenhill | B25J 9/142 |
| | | | 901/22 |
| 2012/0095596 A1* | 4/2012 | Cole | B25J 9/144 |
| | | | 901/29 |

FOREIGN PATENT DOCUMENTS

| CN | 108161958 A * | 6/2018 | B25J 15/0009 |
| JP | S6365973 | 3/1988 | |

OTHER PUBLICATIONS

Tanaka et al., Development of two Types of 2-DOF wrist joint driven by pneumatic artificial muscles. 2013 IEEE International Conference on Mechatronics (ICM). 2013. pp. 471-476.

* cited by examiner

ROBOTIC MANIPULATOR INCLUDING PNEUMATIC ARTIFICIAL MUSCLE

TECHNICAL FIELD

The present invention relates to robotic manipulators actuated by pneumatic artificial muscle (PAM) devices and methods of actuation, and in particular to pitch, roll, and yaw actuation of robotic manipulators.

BACKGROUND

A conventional pneumatic artificial muscle (PAM) or pneumatic muscle actuator generally comprises an internal bladder or tube surrounded by a braided mesh and attached at each end to a mechanical fitting, such as a header comprising female threads, a hook, a coupling, male threads, etc. Exemplary prior art pneumatic artificial muscles include those manufactured by Festo Corporation, the Shadow Robot Company, Kinetic Muscles Inc., and other manufacturers of the McKibben type actuators. When pressurized by a pneumatic source, the internal bladder or tube expands against the interior surface of the braided mesh, which constrains the overall bladder expansion causing the braid to shorten. Concurrently, as the bladder expands, the braid length contracts or decreases, thus producing a contraction force.

PAMs are widely used in factory floor automation, robotics, medical industries, and numerous other applications. The pulling force or bladder contraction when pressurized coupled with the fittings at the bladders two ends allows the actuators to produce an action, reaction, or work, such as toggling a switch or lifting a payload. As a typical PAM only generates a unidirectional force when pressurized by a pneumatic source, two PAMs are generally necessary when a bi-directional force is required. With two PAMs, the number of supporting devices to operate the PAMs, such as controllers, electronics, and a larger compressed pneumatic source, also increase. In a typical installation, the two PAMs are generally mounted in an antagonistic configuration to create a push and a pull. To create more degrees of freedom, more pairs of PAMS are required, typically a pair per degree of freedom (e.g., 3 pairs of PAMs for pitch, roll, and yaw actuation).

While using multiple PAMs in an application is a viable option, space or size of a particular application, funding and other constraints may make their use impracticable. Accordingly, there is a need for a pneumatic muscle actuator system that allows for high degrees of freedom without significantly added equipment, lower cost, and a smaller form factor.

In manufacturing environments, human operators work closely with robotic manipulators. With the manipulators' compliance (the ability of an object to yield elastically when a force is applied) and back drivability, these systems can provide safe operation. The stiffness of the actuator can be adjusted to satisfy the needs of the work environment.

In existing standard robotic manipulators, there is low to no compliance due to high gear ratios and high stiffness. This can be added to standard manipulators with added force torque sensors and advanced control algorithms. However, other solutions for controlled compliance and actuation of robotic manipulators are desirable.

SUMMARY

The present invention provides systems and methods for the controlled actuation of robotic manipulators with cost effectiveness and efficiency.

In accordance with an embodiment of the present invention, a robotic manipulator comprises: a platform; a first pair of pneumatic artificial muscle (PAM) devices coupled to the platform at a first end of the first pair of PAM devices; a second pair of PAM devices coupled to the platform at a first end of the second pair of PAM devices; a first pulley coupling the first pair of PAM devices via a first belt at a second end of the first pair of PAM devices; a second pulley coupling the second pair of PAM devices via a second belt at a second end of the second pair of PAM devices; a U-joint positioned between the first and second pulleys, wherein the first pulley, the second pulley, and the U-joint are rotatable along a pitch axis, a yaw axis, and a roll axis; and an actuated object coupled to the U-joint, wherein motion of one of the first belt of the first pair of PAM devices, the second belt of the second pair of PAM devices, and both the first belt and the second belt, cause motion of the actuated object along one of the pitch axis, the yaw axis, and the roll axis.

The above-mentioned robotic manipulator may have the following alternative components, which may also be combined in various applicable and functioning combinations within the scope of the present invention. In alternative embodiments, the robotic manipulator includes the following elements in complete or partial combination or each element alone: the U-joint includes a first link actuated by the first pulley and a second link actuated by the second pulley; the first pulley and the second pulley are positioned next to one another in parallel along the pitch axis; the first pulley, the second pulley, and the U-joint are coupled to a common pivot joint along the roll axis; the first pulley, the second pulley, and the U-joint are coupled to a common pivot joint along the yaw axis; the first pulley is independent of the second pulley; each of the PAM devices are independently actuatable; the first pair of PAM devices and the second pair of PAM devices are arranged in parallel planes along the pitch axis at rest; diagonally opposite PAM devices are actuatable to cause motion of the actuated object along the yaw axis; congruous motions of the first belt and the second belt cause motion of the actuated object along the pitch axis; antagonistic motions of the first belt and the second belt cause motion of the actuated object along the roll axis; a brake; control means operably coupled to the PAM devices for independent actuation of each of the PAM devices; each of the PAM devices are initially angled between about 45 degrees and about 90 degrees from a plane of the platform; and/or a slope of a top view projection of a PAM device and corresponding belt is less than 1, such that an X-axis length of the top view projection is greater than a Y-axis length of the top view projection.

In accordance with another embodiment of the present invention, a method of actuating a robotic manipulator is provided, the method comprising providing a robotic manipulator as described above, and actuating one of the first belt, the second belt, and both the first belt and the second belt, to cause motion of the actuated object along one of the pitch axis, the yaw axis, and the roll axis.

The above-mentioned method of actuating a robotic manipulator may have the following alternative steps, which may also be combined in various applicable and functioning combinations within the scope of the present invention. In alternative embodiments, the method includes the following elements in complete or partial combination or each element alone: actuating diagonally opposite PAM devices to cause motion of the actuated object along the yaw axis; actuating both PAM devices of one of the first and second pair of PAM devices to cause motion of the actuated object along the roll axis; actuating the first and second pair of PAM devices to cause antagonistic motions of the first belt and the second belt to cause motion of the actuated object along the roll axis; actuating the first and second pair of PAM devices to cause congruous motions of the first belt and the second belt to cause motion of the actuated object along the pitch axis; and/or actuating one PAM device of one of the first and second pair of PAM devices to cause motion of the actuated object along the pitch axis.

DESCRIPTION OF THE FIGURES

Robotic manipulators and methods for actuation according to the invention and some particular embodiments thereof will be described with reference to the following figures. These and other features, aspects, and advantages of the present invention will become better understood when the following detailed description is read with reference to the accompanying drawings in which like characters represent like parts throughout the drawings. Some embodiments are illustrated by way of example and not limitation in the figures of the accompanying drawings. Unless noted, the drawings may not be drawn to scale.

FIG. 3A-1 is a perspective view of another robotic manipulator system including two sets of PAM devices allowing an end effector to have four degrees of freedom;

FIG. 3A-2 illustrates top view projections of the PAM devices and distances between attachment points of the PAM devices and pulleys from one another;

DETAILED DESCRIPTION

Four pneumatic artificial muscles (PAMs) (also referred to as pneumatic muscle actuators) are used for different robot designs in accordance with embodiments of the present invention. A PAM is a pneumatic bladder or pneumatic drive means that can extend or contract by regulating the inner air pressure via valves. PAMs can create unidirectional forces; therefore, two PAMs are paired to constitute an antagonistic PAM unit to provide motion flexibility. According to the present disclosure, arranging the paired PAM units result in three robot designs that possess different numbers of active joints and workspace.

Figure 1A:
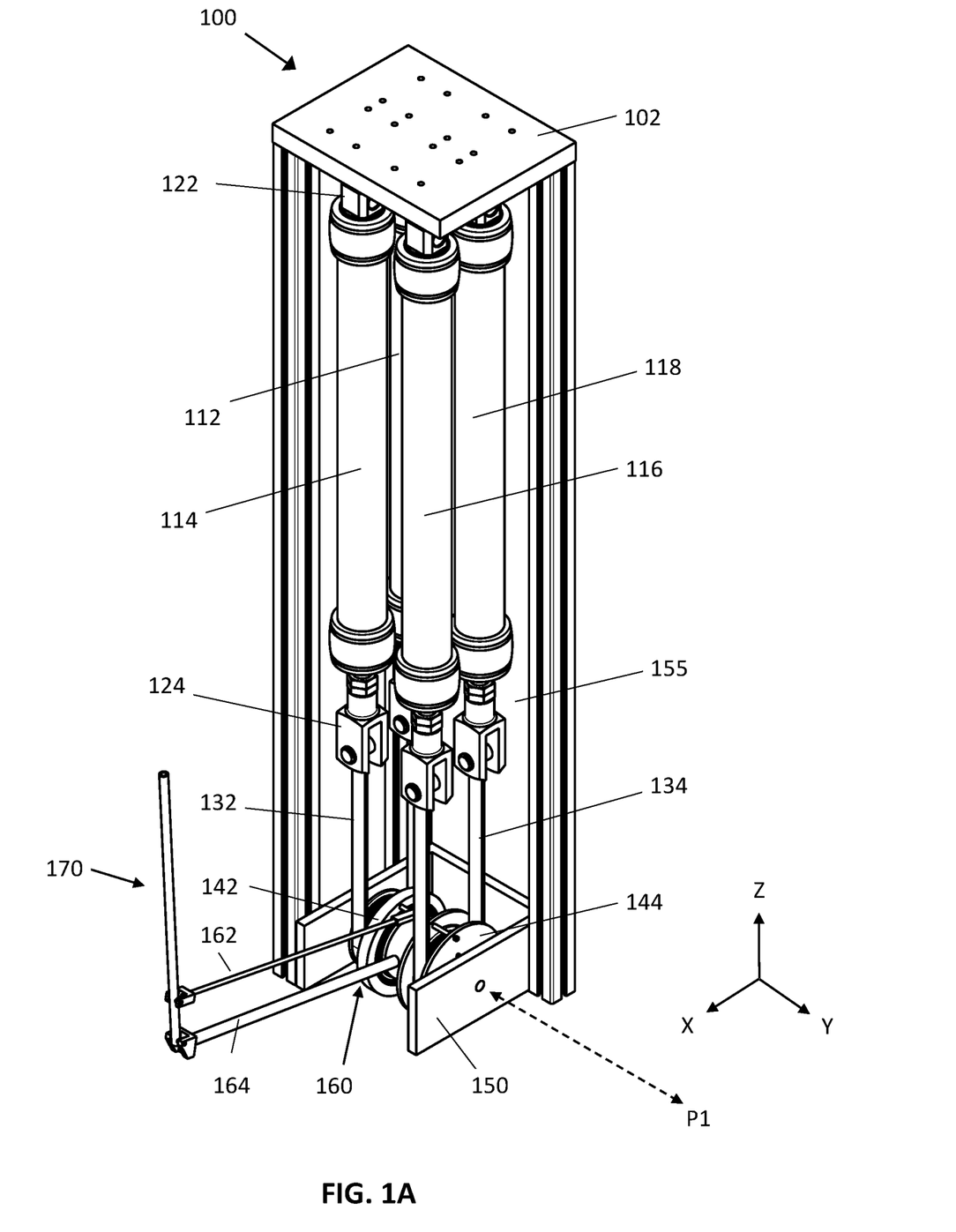
FIG. 1A is a perspective view of a robotic manipulator system including two sets of PAM devices allowing an end effector to have two degrees of freedom.
Figure 1B:
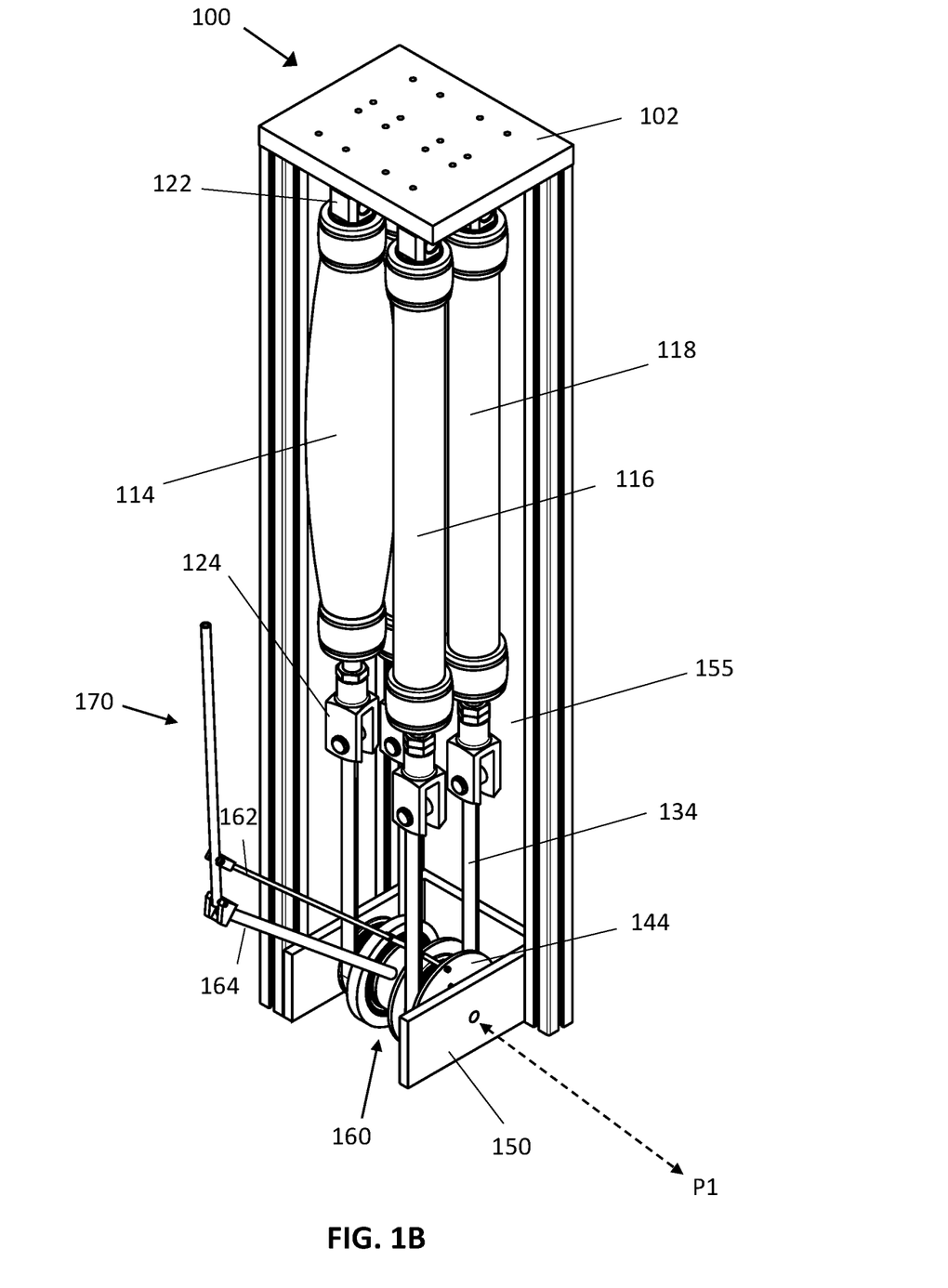
FIG. 1B is a perspective view of the robotic manipulator system of FIG. 1A after actuation of one PAM device and pitch motion of the end effector.

Referring now to FIGS. 1A-1B, perspective views of a robotic manipulator system 100 are shown, the system including two sets of PAM devices, allowing an end effector or actuated object 170 to have two degrees of freedom. FIG. 1B is a perspective view of the robotic manipulator system 100 of FIG. 1A after actuation of one PAM device and pitch motion of the end effector 170.

In accordance with embodiments of the present invention, robotic manipulator system 100 includes a platform 102, a first pair of pneumatic artificial muscle (PAM) devices 112, 114 fixedly coupled to the platform 102 at a first end of the first pair of PAM devices, and a second pair of PAM devices 116, 118 fixedly coupled to the platform 102 at a first end of the second pair of PAM devices. PAM devices 112, 114, 116, 118 can be fixedly coupled to fixed platform 102 by nuts and bolts 122 or other coupling means. System 100 further includes a first pulley 142 coupling the first pair of PAM devices 112, 114 via a first belt 132 at a second end of the first pair of PAM devices, a second pulley 144 coupling the second pair of PAM devices 116, 118 via a second belt 134 at a second end of the second pair of PAM devices, and a U-joint 160 positioned between the first pulley 142 and the second pulley 144. The first pulley 142, the second pulley 144, and the U-joint 160 are rotatable along a pitch axis P1. First belt 132 can be fixedly coupled to PAM devices 112, 114 and second belt 134 can be fixedly coupled to PAM devices 116, 118 by nuts, bolts, and brackets 124 or other coupling means. The first pulley 142, the second pulley 144, and the U-joint 160 are positioned in a U-shaped housing 150 to be rotatable along pitch axis P1, which is perpendicular to the rotation plane of belts 132 and 134 in the rest position of PAM devices 112-118. U-shaped housing 150 is fixedly coupled to a housing wall 155. It is further noted that pulleys 142 and 144 and U-joint 160 are each positioned adjacent to one another along pitch axis P1 but rotate in parallel planes perpendicular to the pitch axis P1.

End effector or actuated object 170 is coupled to the U-joint 160, wherein motion of either the first belt 132 of the first pair of PAM devices 112, 114, or motion of the second belt 134 of the second pair of PAM devices 116, 118, or congruous motion of both belts 132, 134 causes motion of the end effector 170 along the pitch axis P1.

FIG. 1B is a perspective view of the robotic manipulator system 100 of FIG. 1A after actuation of PAM device 114, which results in contraction of PAM device 114, actuation of belt 132, rotation of pulley 142, motion of U-joint 160, and pitch motion of end effector 170, as illustrated by raised U-joint 160 from horizontal.

In system 100, two antagonistic PAM pairs are utilized, namely, PAM devices 112 and 114, and PAM devices 116 and 118. A five-bar mechanism (with five links, including ground) is utilized to yield a robot arm with 2 active joints (DoFs) which can generate motion along the pitch axis P1. Each PAM pair is connected to robot links via pulleys so as to convert translational PAM motion into rotational motion. The paired PAM units are isolated from each other, meaning that each paired PAM unit is specifically devoted to a certain joint. PAM devices 112 and 114 may independently actuate pulley 142 and a first link 162, and PAM devices 116 and 118 may independently actuate pulley 144 and a second link 164. Thus, two independent pitch motions may be actuated along pitch axis P1.

Accordingly, it is noted that other PAM devices 112, 116, or 118 can be actuated to cause pitch motion of end effector 170. Actuation of PAM device 116 will also cause an upward pitch motion from horizontal of U-joint 160 and end effector

170. Actuation of PAM device 112 or 118 will cause a downward pitch motion from horizontal of U-joint 160 and end effector 170.

It is noted that system 100 is pictured with the PAM devices 112-118 initially or starting at about 90 degrees (about perpendicular) to the X-Y plane (and also the plane of platform 102), but the PAM devices may be initially aligned between about 45 degrees to about 90 degrees to the X-Y plane (and also the plane of platform 102).

Figure 2A:
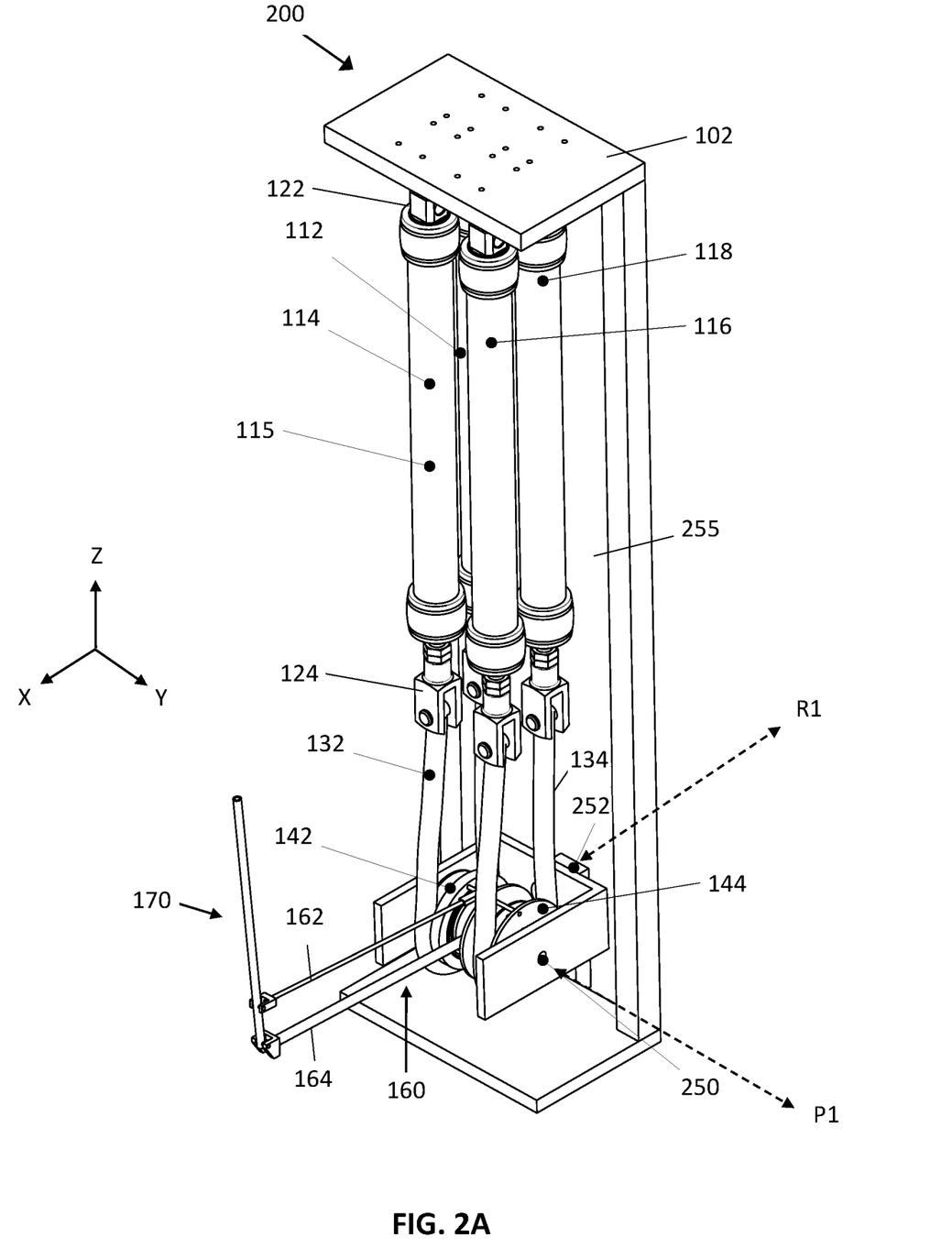
FIG. 2A is a perspective view of another robotic manipulator system including two sets of PAM devices allowing an end effector to have three degrees of freedom.
Figure 2B:
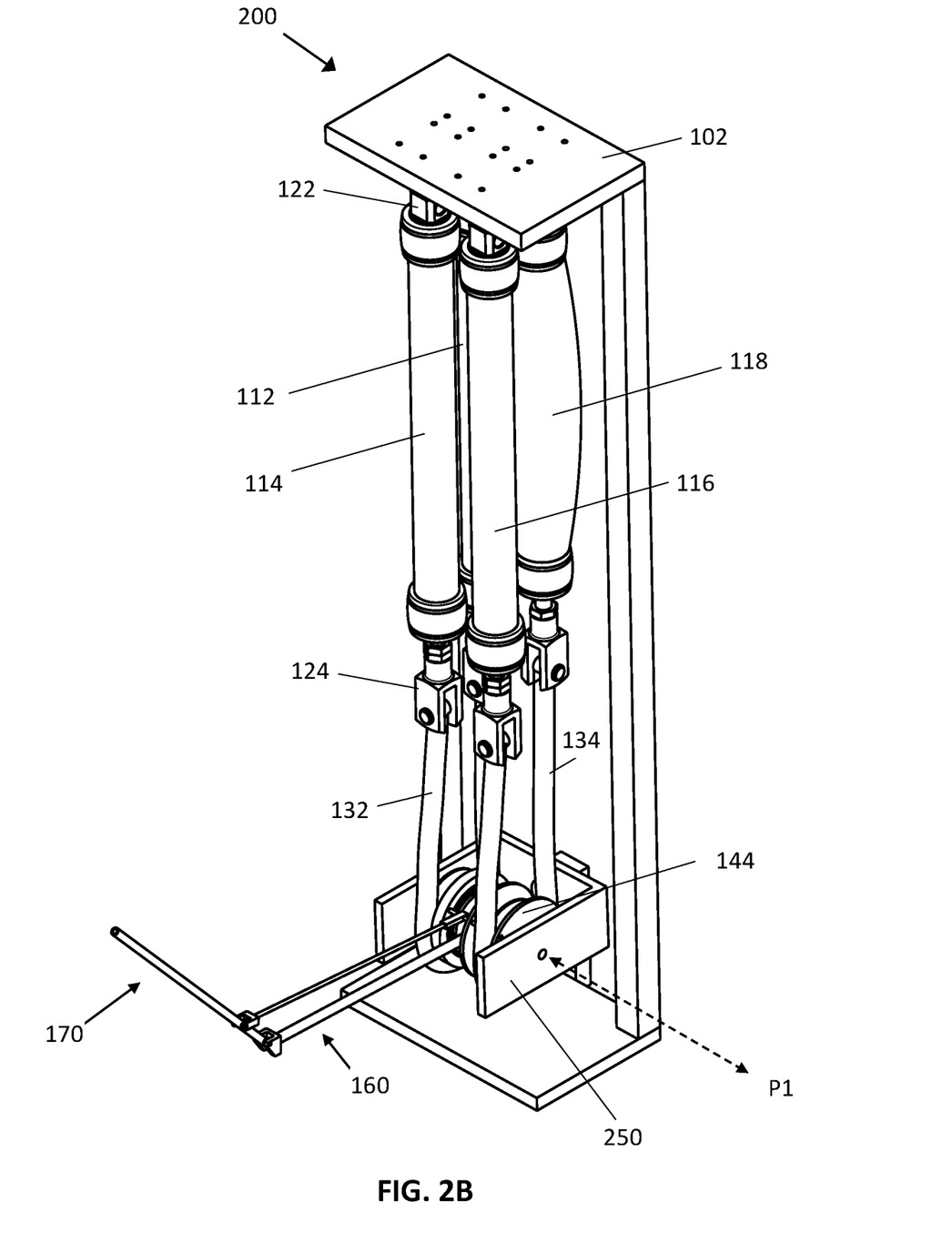
FIG. 2B is a perspective view of the robotic manipulator system of FIG. 2A after actuation of one PAM device and pitch motion of the end effector.
Figure 2C:
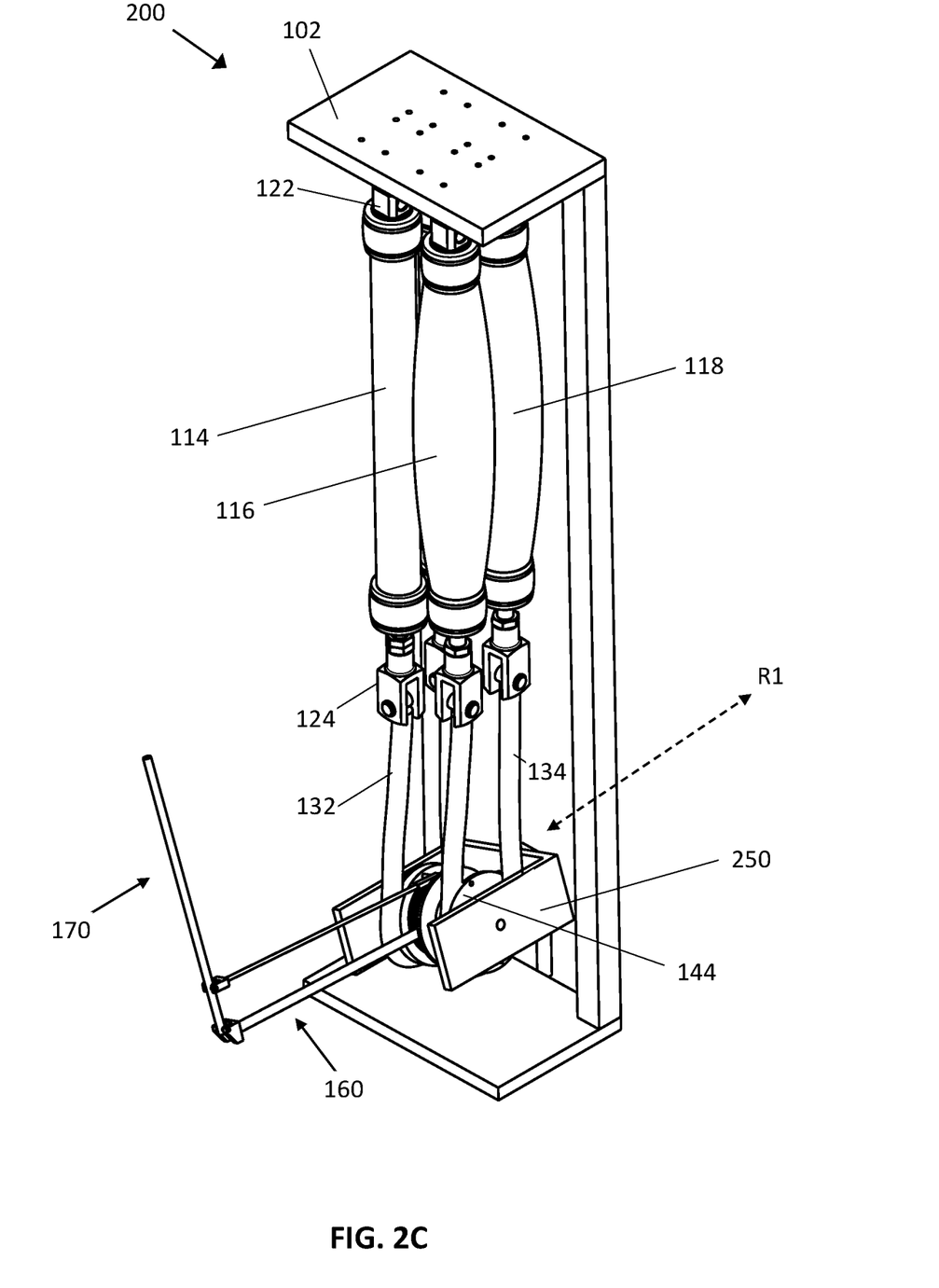
FIG. 2C is a perspective view of the robotic manipulator system of FIG. 2A after actuation of a pair of PAM devices and roll motion of the end effector.

Referring now to FIGS. 2A-2C, perspective views of another robotic manipulator system 200 are shown, the system including two sets of PAM devices allowing end effector 170 to have three degrees of freedom. FIG. 2B is a perspective view of the robotic manipulator system of FIG. 2A after actuation of one PAM device and pitch motion of the end effector 170. FIG. 2C is a perspective view of the robotic manipulator system of FIG. 2A after actuation of a pair of PAM devices and roll motion of the end effector 170. In accordance with embodiments of the present invention, robotic manipulator system 200 (similar to system 100) includes platform 102, first pair of pneumatic artificial muscle (PAM) devices 112, 114 fixedly coupled to the platform 102 at a first end of the first pair of PAM devices, and second pair of PAM devices 116, 118 fixedly coupled to the platform 102 at a first end of the second pair of PAM devices. PAM devices 112, 114, 116, 118 can be fixedly coupled to platform 102 by nuts and bolts 122 or other coupling means.

System 200 further includes first pulley 142 coupling the first pair of PAM devices 112, 114 via first belt 132 at a second end of the first pair of PAM devices, second pulley 144 coupling the second pair of PAM devices 116, 118 via second belt 134 at a second end of the second pair of PAM devices, and U-joint 160 positioned between the first pulley 142 and the second pulley 144. The first pulley 142, the second pulley 144, and the U-joint 160 are rotatable along a pitch axis P1 and a roll axis R1. First belt 132 can be fixedly coupled to PAM devices 112, 114 and second belt 134 can be fixedly coupled to PAM devices 116, 118 by nuts, bolts, and brackets 124 or other coupling means. Belts 132 and 134 are used to connect their respective PAM device pairs and to transmit the motion from the actuation of the PAM devices to respective pulleys. The pulleys then transform the translational motion of the PAM devices to rotational motion for joint control.

The first pulley 142, the second pulley 144, and the U-joint 160 are positioned in a U-shaped housing 250 to be rotatable along pitch axis P1, which is perpendicular to the rotation plane of belts 132 and 134 in the rest position of PAM devices 112-118. Within U-shaped housing 250, pulleys 142 and 144 and U-joint 160 are each positioned adjacent to one another along pitch axis P1 but rotate in parallel planes perpendicular to the pitch axis P1. U-shaped housing 250 is rotatably coupled to a housing wall 255 by a rotating joint 252 which allows U-shaped housing 250 to be rotatable along roll axis R1. End effector or actuated object 170 is coupled to the U-joint 160, wherein motion of either the first belt 132 of the PAM device pair 112, 114, or motion of the second belt 134 of the PAM device pair 116, 118, or congruous motion of both belts 132, 134 causes motion of the first and second pulleys 142, 144 and U-joint 160 along the pitch axis P1 and thereby pitch motion of end effector 170, one example of which is illustrated in FIG. 2B. Congruous motion of one belt (i.e., either actuation of the first pair of PAM devices 112, 114 or actuation of the second pair of PAM devices 116, 118) causes motion of housing 250, the first and second pulleys 142, 144, and U-joint 160 along the roll axis R1 and thereby roll motion of end effector 170, one example of which is illustrated in FIG. 2C.

FIG. 2B is a perspective view of the robotic manipulator system 200 of FIG. 2A after actuation of PAM device 118, which results in contraction of PAM device 118, actuation of belt 134, rotation of pulley 144, motion of U-joint 160, and thereby pitch motion of end effector 170 along pitch axis P1 in a forward direction. Stretching of PAM devices 112 and 114 must be controlled when PAM device 118 is actuated in order to prevent a roll movement along roll axis R1. It is noted that actuation of PAM device 112 can cause a similar forward pitch motion of end effector 170, and actuation of PAM device 114 or 116 can cause a pitch motion of end effector 170 in a backward direction or an opposite direction to that caused by actuation of PAM device 112 or 118.

FIG. 2C is a perspective view of the robotic manipulator system 200 of FIG. 2A after actuation of both PAM devices 116 and 118, which results in contraction of PAM devices 116 and 118, actuation of belt 134 (pulling upward), pulling upward of pulley 144 and an end of housing 250, roll motion of U-joint 160, and thereby roll motion of end effector 170 along roll axis R1. It is noted that both PAM devices 112 and 114 can be actuated while PAM devices 116 and 118 are not actuated to cause roll motion of end effector 170 along roll axis R1 in the opposite direction to the case shown when PAM devices 116 and 118 are actuated while PAM devices 112 and 114 are not actuated.

In system 200, paired PAM units can be antagonistically driven to generate motion along the roll axis. On top of the existing structure in the 2 DoF design (FIGS. 1A-1B), PAM device pair 112, 114 and PAM device pair 116, 118 can work in an antagonistic fashion via a round belt to allow a base rotation along the roll axis R1, introducing the third DoF to the robot arm system.

It is further noted that roll movement along roll axis R1 may also occur through the stretching of PAM devices 112, 114, and one of PAM devices 116 and 118 when they are loaded with the same pressure while the other one of PAM devices 116 and 118 is contracted. A mirroring pattern of stretching PAM devices 116, 118 and one of PAM devices 112 and 114 with the same pressure while the other one of PAM devices 112 and 114 is contracted would also produce a roll movement along roll axis R1.

It is noted that system 200 is pictured with the PAM devices 112-118 initially or starting at about 90 degrees (about perpendicular) to the X-Y plane (and also the plane of platform 102), but the PAM devices may be initially aligned between about 45 degrees to about 90 degrees to the X-Y plane (and also the plane of platform 102).

Figure 3A:
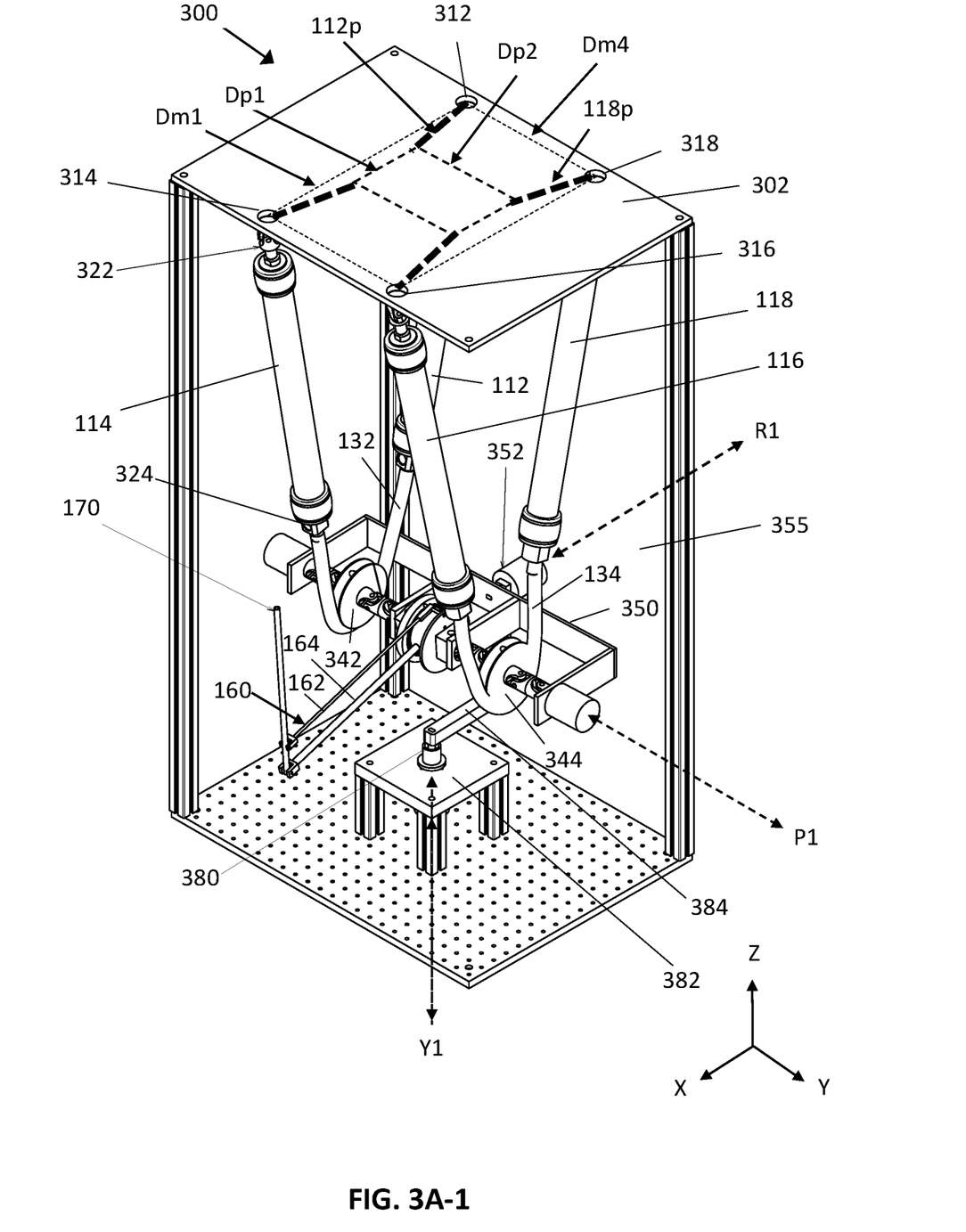
Figure 3A:
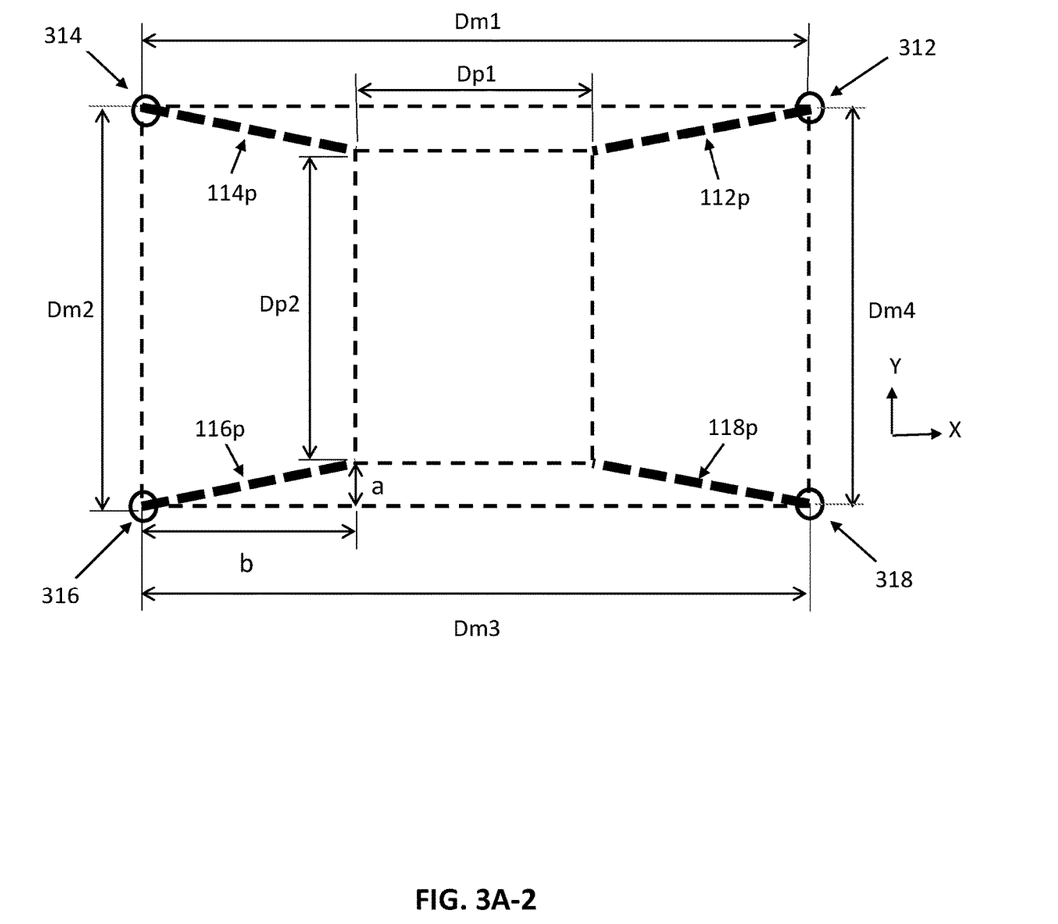
Figure 3B:
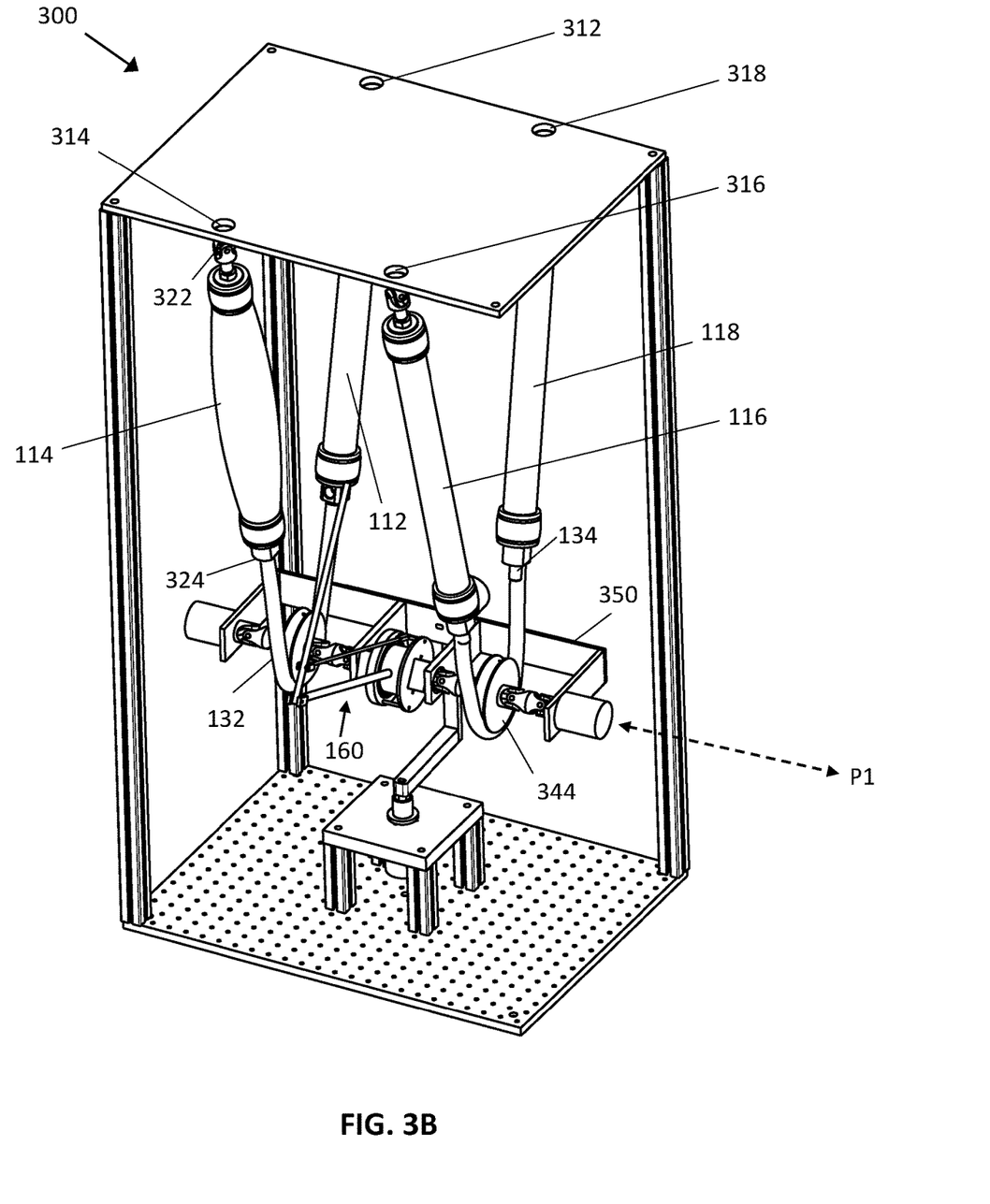
FIG. 3B is a perspective view of the robotic manipulator system of FIG. 3A-1 after actuation of one PAM device and pitch motion of the end effector.
Figure 3C:
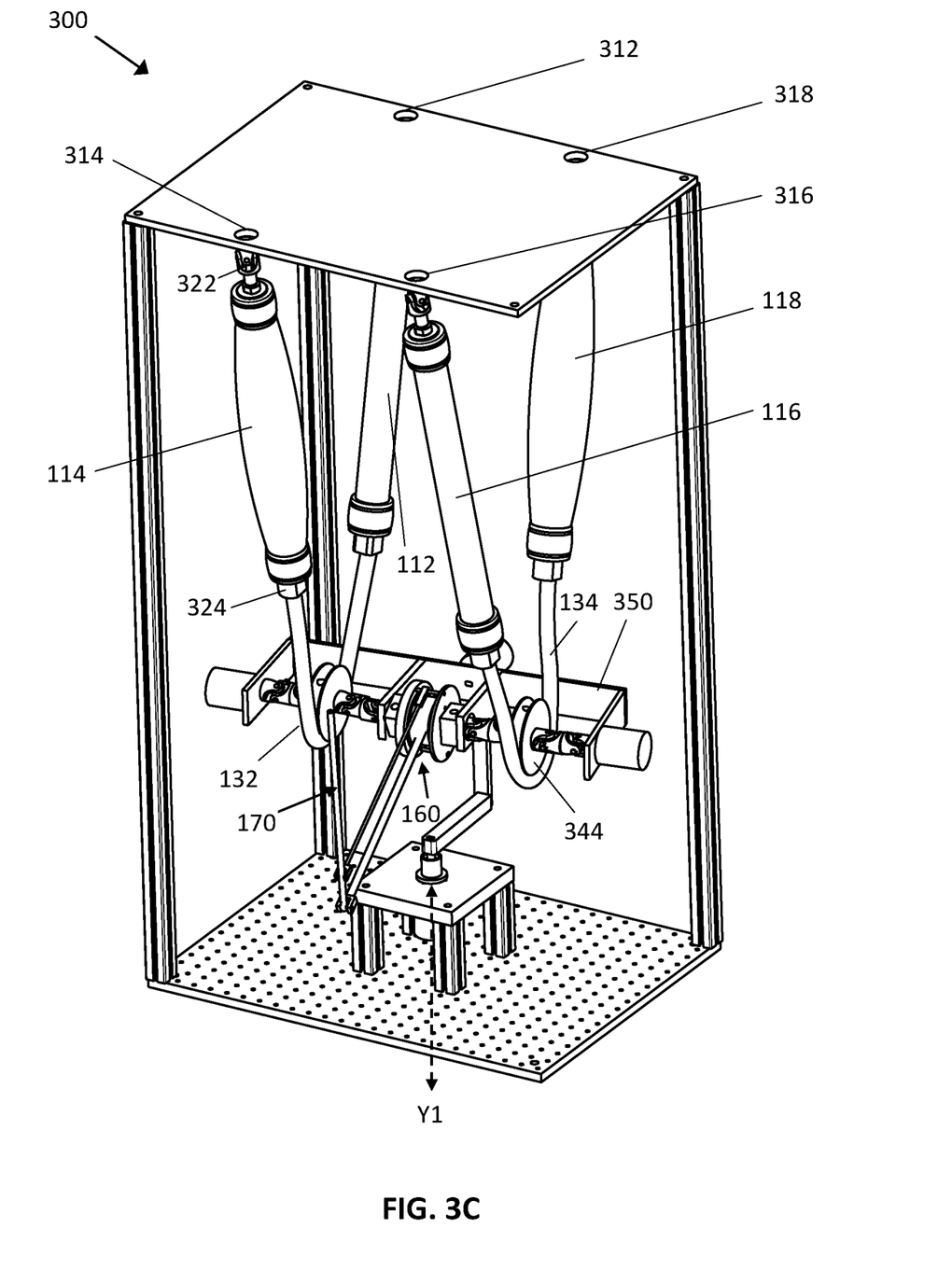
FIG. 3C is a perspective view of the robotic manipulator system of FIG. 3A-1 after actuation of a pair of diagonally-opposite PAM devices and yaw motion of the end effector.
Figure 3D:
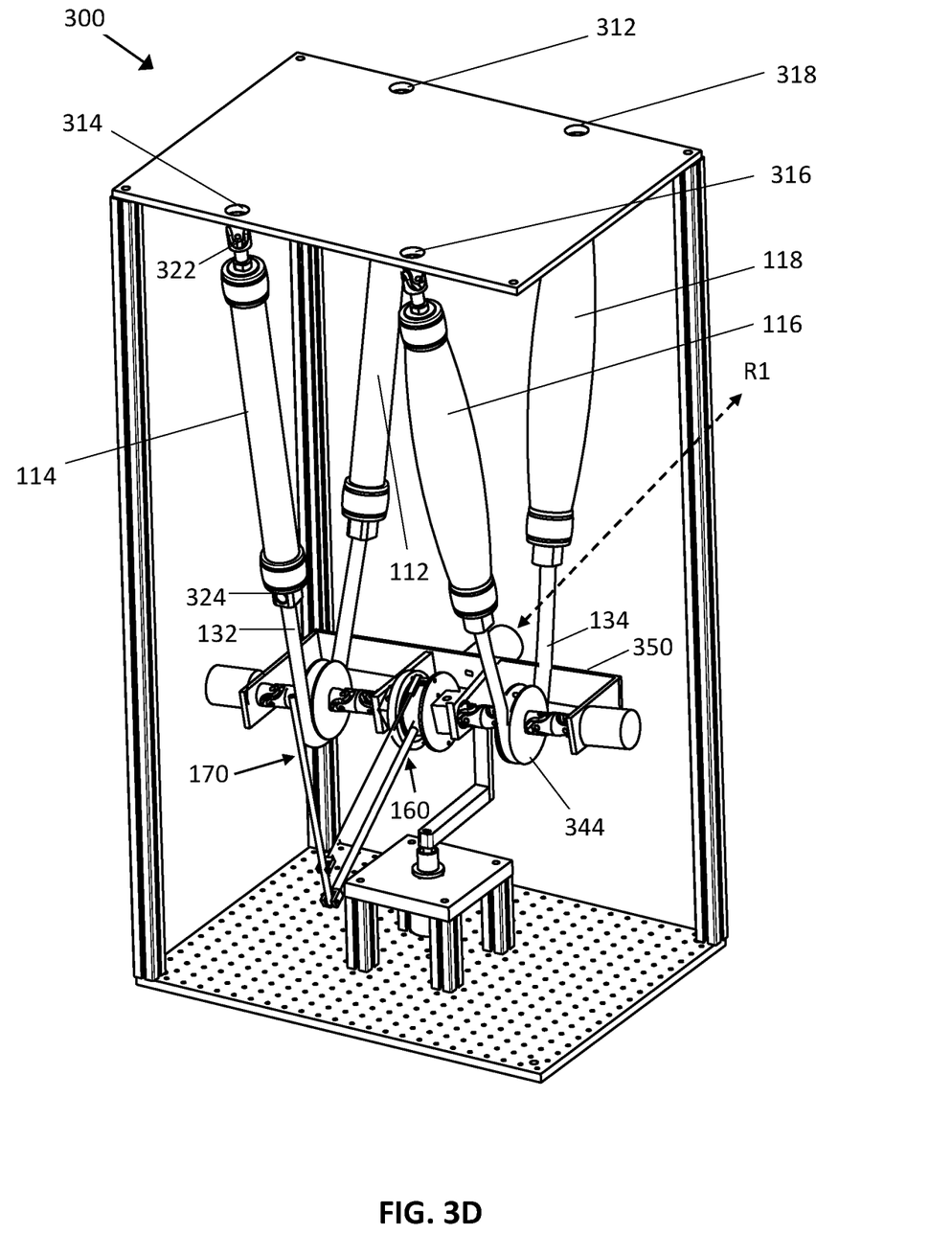
FIG. 3D is a perspective view of the robotic manipulator system of FIG. 3A-1 after actuation of a pair of PAM devices and roll motion of the end effector.

Referring now to FIGS. 3A-1 to FIG. 3D, perspective views of another robotic manipulator system 300 are shown, the system including two sets of PAM devices allowing an end effector to have four degrees of freedom. FIG. 3A-2 illustrates top view projections of the PAM devices (and possibly belts) and distances between attachment points of the PAM devices and pulleys from each other. FIG. 3B is a perspective view of the robotic manipulator system of FIG. 3A-1 after actuation of one PAM device and pitch motion of the end effector. FIG. 3C is a perspective view of the robotic manipulator system of FIG. 3A-1 after actuation of a pair of diagonally-opposite PAM devices and yaw motion of the end effector. FIG. 3D is a perspective view of the robotic manipulator system of FIG. 3A-1 after actuation of a pair of PAM devices and roll motion of the end effector 170.

In accordance with embodiments of the present invention, robotic manipulator system 300 (similar to system 200) includes platform 302, first pair of pneumatic muscle actuators (PAM) devices 112, 114 movably coupled to the platform 302 at a first end of the first pair of PAM devices, and second pair of PAM devices 116, 118 movably coupled to the platform 102 at a first end of the second pair of PAM devices. PAM devices 112-118 can be movably coupled to platform 302 by universal joints 322, ball and socket joints, or other movable coupling means. PAM devices 112-118 are coupled to platform 302 at attachment points 312-318, respectively.

System 300 further includes a first pulley 342 coupling the first pair of PAM devices 112, 114 via a first belt 132 at a second end of the first pair of PAM devices, second pulley 344 coupling the second pair of PAM devices 116, 118 via second belt 134 at a second end of the second pair of PAM devices, and U-joint 160 positioned between the first pulley 342 and the second pulley 344, wherein the first pulley 342, the second pulley 344, and the U-joint 160 are rotatable along a pitch axis P1, a roll axis R1, and a yaw axis Y1. First belt 132 can be fixedly coupled to PAM devices 112, 114 and second belt 134 can be fixedly coupled to PAM devices 116, 118 by nuts and bolts 324 or other coupling means.

The first pulley 342, the second pulley 344, and the U-joint 160 are positioned in a U-shaped housing 350 to be rotatable along roll axis R1, yaw axis Y1, and pitch axis P1. First pulley 342, second pulley 344, and U-joint 160 are positioned along pitch axis P1 within U-shaped housing 350 but are rotatable in parallel planes perpendicular to pitch axis P1, which is also perpendicular to the rotation plane of belts 132 and 134 in the rest position of PAM devices 112-118. U-shaped housing 350 is rotatably coupled to a housing wall 355 by a rotating joint 352 which allows U-shaped housing 350 to be rotatable along roll axis R1. U-shaped housing 350 is also rotatably coupled to a pivot joint 380 on a stand 382 by a bar 384, which allows U-shaped housing 350 to be rotatable along yaw axis Y1.

End effector or actuated object 170 is coupled to the U-joint 160, wherein motion of either the first belt 132 of the first pair of PAM devices 112, 114, or motion of the second belt 134 of the second pair of PAM devices 116, 118, or congruous motion of both belts 132, 134 causes motion of the first and second pulleys 142, 144 and U-joint 160 along the pitch axis P1 and thereby pitch motion of end effector 170, an example of which is shown in FIG. 3B. Actuation of diagonally opposite PAM devices cause motion of housing 350, first and second pulleys 342, 344, and U-joint 160, and thereby motion of the actuated object along the yaw axis, an example of which is shown in FIG. 3C. Congruous motion of one belt (i.e., actuation of the first pair of PAM devices 112, 114 or the second pair of PAM devices 116, 118) causes motion of housing 350, the first and second pulleys 342, 344, and U-joint 160 along the roll axis R1 and thereby roll motion of end effector 170, an example of which is shown in FIG. 3D.

In system 300, the PAM device positions are changed from the systems 100 and 200 so that in the starting or initial position, the PAM devices are positioned with some angle with respect to the X, Y, and Z axes (systems 100 and 200 are pictured with the PAM devices 112-118 initially or starting at about 90 degrees or perpendicular to the X-Y plane but the PAM devices may be initially aligned between about 45 degrees to about 90 degrees to the X-Y plane). In one embodiment, the PAM devices 112-118 (their lengthwise axis) may be initially angled between about 45 degrees to about 90 degrees to the X-Y plane (and also the plane of platform 302).

In system 100 and 200, the preferred angle of the PAM devices is 90 degrees as shown in FIG. 1A and FIG. 2A. At this angle, said PAM devices provide maximum efficiency. In system 300, the preferred angle of the PAM devices is between 45 degrees to 90 degrees in each of the yaw, pitch and roll axis as shown in FIG. 3A-1. More preferred angle in each of the three axes is between 45 degrees to 85 degrees, most preferably between 45 degrees to 60 degrees.

FIG. 3A-1 and FIG. 3A-2 illustrate projections of the PAM devices and distances between attachment points 312, 314, 316, and 318 of the PAM devices 112, 114, 116, and 118, respectively, and pulleys 342 and 344 from one another. PAM device 112 is movably coupled to platform 302 at attachment point 312, PAM device 114 is movably coupled to platform 302 at attachment point 314, PAM device 116 is movably coupled to platform 302 at attachment point 316, and PAM device 118 is movably coupled to platform 302 at attachment point 318. A top view projection of PAM device 112 is illustrated as dashed line 112p, a top view projection of PAM device 114 is illustrated as dashed line 114p, a top view projection of PAM device 116 is illustrated as dashed line 116p, and a top view projection of PAM device 118 is illustrated as dashed line 118p. The distance between the center of attachment point 312 and the center of attachment point 314 is illustrated by dashed line Dm1, the distance between the center of attachment point 314 and the center of attachment point 316 is illustrated by dashed line Dm2, the distance between the center of attachment point 316 and the center of attachment point 318 is illustrated by dashed line Dm3, and the distance between the center of attachment point 318 and the center of attachment point 312 is illustrated by dashed line Dm4.

The diameter of pulleys 342 and 344, as well as where the top view projections of the PAM devices (and belts) begin from the pulleys, are illustrated by dashed line Dp1. The distance between pulleys 342 and 344 (e.g., along pitch axis P1) is illustrated by dashed lines Dp2.

As shown by top view projections 112p-118p, PAM devices 112-118 are angled with respect to the Y-Z plane as well as with respect to the X-Y plane (also plane of platform 302). A Y-axis distance "a" and an X-axis distance "b" between the start of a PAM device top view projection leaving a pulley and a respective attachment point show the angle or slope of the PAM device's top view projection along the X-Y plane. In accordance with embodiments of the present invention, distance "b" is greater than distance "a" (b>a), such that a slope of a top view projection of a PAM device (and possible belt) is less than 1. In other words, the X-axis length ("run") of the top view projection of a PAM device is greater than the Y-axis length ("rise") of the top view projection of the PAM device.

In other embodiments, the first pair of PAM devices and the second pair of PAM devices may be arranged in parallel planes along the pitch axis at rest such that distance "a" would be zero.

FIG. 3B is a perspective view of the robotic manipulator system 300 of FIG. 3A-1 after actuation of PAM device 114, which results in contraction of PAM device 114, actuation of belt 132, rotation of pulley 342, motion of U-joint 160, and thereby pitch motion of end effector 170 along pitch axis P1. During this movement, roll and yaw movements may be negated and pitch movement enabled by controlled stretching in the other PAM devices 112, 116, and 118. Otherwise, pitch movement may enabled through the closing of clutches in the system. As noted above, contraction of other PAM devices 112, 116, or 118 alone may likewise cause pitch motion in the same or opposite directions as illustrated in FIG. 3B.

FIG. 3C is a perspective view of the robotic manipulator system 300 of FIG. 3A-1 after actuation of diagonally opposite PAM devices 114 and 118, which results in contraction of PAM devices 114 and 118, actuation of belts 132, 134 in antagonistic motion causing a twisting motion to housing 350 and U-joint 160, thereby causing yaw motion of end effector 170 along yaw axis Y1. Yaw motion is enabled by the contraction of transverse muscles, namely of PAM devices 114 and 118 or of PAM devices 112 and 116. The direction of movement is provided by the force sequencing of the PAM devices. In FIG. 3C, a yaw movement is shown to be enabled by a more intense contraction of PAM devices 114 and 118. It is noted that actuation of PAM devices 112 and 116 will cause yaw movement in the opposite direction to that caused by actuation of PAM devices 114 and 118.

In addition to previously explained motions, PAM devices 112 and 116 can be pressurized simultaneously with the same pressure while PAM devices 114 and 118 can be pressurized with equal pressure to each other. Acting force differences and the time difference between pressurizing creates a motion on the yaw axis Y1.

FIG. 3D is a perspective view of the robotic manipulator system 300 of FIG. 3A-1 after actuation of PAM devices 116 and 118, which results in contraction of PAM devices 116 and 118, congruous actuation of belt 134 (pulling upward), pulling upward of pulley 344 and an end of housing 350, motion of U-joint 160, and thereby roll motion of end effector 170 along roll axis R1. It is noted that congruous actuation and contraction of PAM devices 112 and 114 will cause a roll motion of end effector 170 in an opposite direction to that caused by actuation of PAM devices 116 and 118.

Pulleys 142 and 144, pulleys 342 and 344, rotating joints 252 and 352, and pivot joint 380 may include bearing systems for smooth rotational movement. Pulleys 142 and 144, pulleys 342 and 344, rotating joints 252 and 352, and pivot joint 380 may further include breaking mechanisms to limit respective motions.

It is further noted that systems 100, 200, and 300 described above include a control unit for controlling the actuation of PAM devices (i.e., contraction, extension, or rest) and a power supply coupled to the control unit. Each PAM device may include other features, including but not limited to control valves, flow valves, load cells, pressure sensors, rotary encoders, and displacement sensors, which are operably coupled to the control unit.

Each PAM is coupled with a load cell to control the applied force. Basic stiffness control can be achieved using the load cells. Rotary encoders can be attached to the pitch, roll, and yaw axis (e.g., at joints 252, 352, 380 and pulleys 342, 344) to get joint positions and to control the position of the end effector.

Advantageously, the present invention provides for the controlled compliance and actuation of robotic manipulators with actuators at a remote location, efficient use of fewer actuators for movement with higher degrees of freedom, and pneumatic actuation, which provide a lower cost ratio and compact form factor with a high degree of control.

In accordance with a general embodiment of the present disclosure, a robotic manipulator comprises: a platform (302); a first pair of pneumatic artificial muscle (PAM) devices (112, 114) coupled to the platform (302) at a first end of the first pair of PAM devices; a second pair of PAM devices (116, 118) coupled to the platform (302) at a first end of the second pair of PAM devices; a first pulley (342) coupling the first pair of PAM devices via a first belt (132) at a second end of the first pair of PAM devices; a second pulley (344) coupling the second pair of PAM devices via a second belt (134) at a second end of the second pair of PAM devices; a U-joint (160) positioned between the first and second pulleys, wherein the first pulley (342), the second pulley (344), and the U-joint (160) are rotatable along a pitch axis (P1), a yaw axis (Y1), and a roll axis (R1); and an actuated object (170) coupled to the U-joint (160), wherein motion of one of the first belt (132) of the first pair of PAM devices, the second belt (134) of the second pair of PAM devices, and both the first belt and the second belt, cause motion of the actuated object (170) along one of the pitch axis, the yaw axis, and the roll axis.

The above-mentioned robotic manipulator may have the following alternative components, which may also be combined in various applicable and functioning combinations within the scope of the present invention. In alternative embodiments, the robotic manipulator includes the following elements in complete or partial combination or each selective element alone: the U-joint (160) includes a first link (162) actuated by first pulley (342) and a second link (164) actuated by second pulley (344); the first pulley (342) and the second pulley (344) are positioned next to one another in parallel along the pitch axis (P1); the first pulley (342), the second pulley (344), and the U-joint (160) are coupled to a common pivot joint (352) along the roll axis (R1); the first pulley (342), the second pulley (344), and the U-joint (160) are coupled to a common pivot joint (380) along the yaw axis (Y1); the first pulley (342) is independent of the second pulley (344); each of the PAM devices are independently actuatable; the first pair of PAM devices and the second pair of PAM devices are arranged in parallel planes along the pitch axis at rest; diagonally opposite PAM devices are actuatable to cause motion of the actuated object (170) along the yaw axis (Y1); congruous motions of the first belt (342) and the second belt (344) cause motion of the actuated object (170) along the pitch axis (P1); antagonistic motions of the first belt (342) and the second belt (344) cause motion of the actuated object (170) along the roll axis (R1); a brake; control means operably coupled to the PAM devices for independent actuation of each of the PAM devices; each of the PAM devices are initially angled between about 45 degrees and about 90 degrees from a plane of the platform (102 or 302); and a slope of a top view projection of a PAM device is less than 1, such that an X-axis length of the top view projection is greater than a Y-axis length of the top view projection.

In accordance with a general embodiment of the present disclosure, a method of robotic manipulator actuation comprises: providing a robotic manipulator as described above; and actuating one of the first belt (132), the second belt (134), and both the first belt (132) and the second belt (134), to cause motion of the actuated object along one of the pitch axis (P1), the yaw axis (Y1), and the roll axis (R1).

The above-mentioned method may have the following alternative steps, which may also be combined in various applicable and functioning combinations within the scope of the present invention. In alternative embodiments, the robotic manipulator actuation method includes the following steps in complete combination or each selective step alone: actuating diagonally opposite PAM devices to cause motion of the actuated object along the yaw axis; actuating both PAM devices of one of the first and second pair of PAM devices to cause motion of the actuated object along the roll axis; actuating the first and second pair of PAM devices to cause antagonistic motions of the first belt and the second belt to cause motion of the actuated object along the roll axis; actuating the first and second pair of PAM devices to cause congruous motions of the first belt and the second belt to cause motion of the actuated object along the pitch axis; and actuating one PAM device of one of the first and second pair of PAM devices to cause motion of the actuated object along the pitch axis.

Although the present invention has been described in connection with some embodiments, it is not intended to be limited to the specific form set forth herein. One skilled in the art would recognize that various features of the described embodiments may be combined in accordance with the invention. Moreover, it will be appreciated that various modifications and alterations may be made by those skilled in the art without departing from the scope of the invention.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment.

Although the invention has been described in detail in connection with only a limited number of embodiments, it should be readily understood that the invention is not limited to such disclosed embodiments. Rather, the invention can be modified to incorporate a number of variations, alterations, substitutions, combinations or equivalent arrangements not heretofore described, but which are commensurate with the spirit and scope of the invention. For example, the use of different materials, different number of PAMs, and different configurations of PAMs are within the scope of the present invention. Furthermore, the various components that make up the robotic manipulator, and methods disclosed above can be alternatives which may be combined in various applicable and functioning combinations within the scope of the present invention. Additionally, while various embodiments of the invention have been described, it is to be understood that aspects of the invention may include only some of the described embodiments. Accordingly, the invention is not to be seen as limited by the foregoing description but is only limited by the scope of the appended claims.

The invention claimed is:

1. A robotic manipulator, comprising:
   a platform (302);
   a first pair of pneumatic artificial muscle (PAM) devices (112, 114) coupled to the platform (302) at a first end of the first pair of PAM devices;
   a second pair of PAM devices (116, 118) coupled to the platform (302) at a first end of the second pair of PAM devices;
   a first pulley (342) coupling the first pair of PAM devices via a first belt (132) at a second end of the first pair of PAM devices;
   a second pulley (344) coupling the second pair of PAM devices via a second belt (134) at a second end of the second pair of PAM devices;
   a U-joint (160) positioned between the first and second pulleys, wherein the first pulley (342), the second pulley (344), and the U-joint (160) are rotatable along a pitch axis (P1), a yaw axis (Y1), and a roll axis (R1); and
   an actuated object (170) coupled to the U-joint (160), wherein motion of one of the first belt (132) of the first pair of PAM devices, the second belt (134) of the second pair of PAM devices, and both the first belt (132) and the second belt (134), cause motion of the actuated object (170) along each of the pitch axis (P1), the yaw axis (Y1), and the roll axis (R1).

2. The robotic manipulator of claim 1, wherein the U-joint (160) includes a first link (162) actuated by the first pulley (342) and a second link (164) actuated by the second pulley (344).

3. The robotic manipulator of claim 1, wherein the first pulley (342) and the second pulley (344) are positioned next to one another in parallel along the pitch axis (P1).

4. The robotic manipulator of claim 1, wherein the first pulley (342), the second pulley (344), and the U-joint (160) are coupled to a common pivot joint (352) along the roll axis (R1).

5. The robotic manipulator of claim 1, wherein the first pulley (342), the second pulley (344), and the U-joint (160) are coupled to a common pivot joint (380) along the yaw axis (Y1).

6. The robotic manipulator of claim 1, wherein the first pulley (342) is independent of the second pulley (344).

7. The robotic manipulator of claim 1, wherein each of the PAM devices are independently actuatable.

8. The robotic manipulator of claim 1, wherein diagonally opposite PAM devices are actuatable to cause motion of the actuated object along the yaw axis.

9. The robotic manipulator of claim 1, wherein congruous motions of the first belt and the second belt cause motion of the actuated object along the pitch axis.

10. The robotic manipulator of claim 1, wherein antagonistic motions of the first belt and the second belt cause motion of the actuated object along the roll axis.

11. The robotic manipulator of claim 1, further comprising control means operably coupled to the PAM devices for independent actuation of each of the PAM devices.

12. The robotic manipulator of claim 1, wherein each of the PAM devices are initially angled between about 45 degrees and about 90 degrees from a plane of the platform (302).

13. The robotic manipulator of claim 1, wherein a slope of a top view projection of a PAM device is less than 1, such that an X-axis length of the top view projection is greater than a Y-axis length of the top view projection.

14. A method of robotic manipulator actuation, the method comprising:
   providing a robotic manipulator comprising:
   a platform (302) coupled to a first pair of pneumatic artificial muscle (PAM) devices (112, 114) at a first end of the first pair of PAM devices and a second pair of PAM devices (116, 118) at a first end of the second pair of PAM devices;
   a first pulley (342) coupling the first pair of PAM devices via a first belt (132) at a second end of the first pair of PAM devices (112, 114);
   a second pulley (344) coupling the second pair of PAM devices via a second belt (134) at a second end of the second pair of PAM devices (116, 118);
   a U-joint (160) positioned between the first and second pulleys, wherein the first pulley (342), the second pulley (344), and the U-joint (160) are rotatable along a pitch axis (P1), a yaw axis (Y1), and a roll axis (R1); and
   an actuated object (170) coupled to the U-joint (160); and
   actuating one of the first belt (132), the second belt (134), and both the first belt (132) and the second belt (134), to cause motion of the actuated object (170) along each of the pitch axis (P1), the yaw axis (Y1), and the roll axis (R1).

15. The method of claim 14, further comprising actuating diagonally opposite PAM devices to cause motion of the actuated object along the yaw axis.

16. The method of claim 14, further comprising actuating both PAM devices of one of the first and second pair of PAM devices to cause motion of the actuated object along the roll axis.

17. The method of claim 14, further comprising actuating the first and second pair of PAM devices to cause antagonistic motions of the first belt and the second belt to cause motion of the actuated object along the roll axis.

18. The method of claim 14, further comprising actuating the first and second pair of PAM devices to cause congruous motions of the first belt and the second belt to cause motion of the actuated object along the pitch axis.

19. The method of claim 14, further comprising actuating one PAM device of one of the first and second pair of PAM devices to cause motion of the actuated object along the pitch axis.

* * * * *